S. SAVICKIS.
SAFETY BOLT AND NUT.
APPLICATION FILED MAY 7, 1918.

1,288,215. Patented Dec. 17, 1918.

INVENTOR
Sam Savickis.
BY
Oscar Geier
his ATTORNEY

UNITED STATES PATENT OFFICE.

SAM SAVICKIS, OF DETROIT, MICHIGAN.

SAFETY BOLT AND NUT.

1,288,215.  Specification of Letters Patent.  Patented Dec. 17, 1918.

Application filed May 7, 1918. Serial No. 233,045.

*To all whom it may concern:*

Be it known that I, SAM SAVICKIS, a citizen of Russia, residing at Hamtramck, Detroit, county of Wayne, and State of Michigan, have invented certain new and useful Improvements in Safety Bolts and Nuts, of which the following is a specification.

This invention relates to improvements in methods of securing nuts with relation to bolts when adjusted thereon.

The principal object of the invention is to prevent the premature displacement of a nut from a bolt so as to retain the same in adjustment.

A further object is to provide a device contained within the bolt, engageable with recesses formed within the nut, whereby it may be locked in an adjusted position, means also being provided for the retraction of the locking element.

These and other like objects are attained by the novel construction and combination of parts hereinafter described and shown in the accompanying drawing, forming a material part of this disclosure, and in which:—

Figure 1:
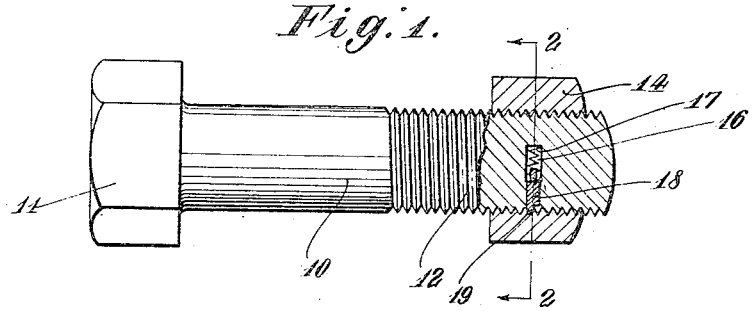
Figure 1 is a side elevational view of a conventional type of bolt, the screw-threaded end and engaged nut being shown in section.
Figure 2:
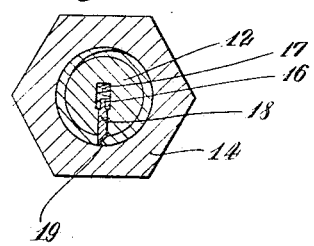
Fig. 2 is a transverse sectional view taken on line 2—2 of Fig. 1.

In the drawings, the numeral 10, designates a conventional type of bolt having a shank or body section adjacent to the head 11, and a threaded portion 12 as is usual. Fitted to engage with the threads is a nut 14 of the ordinary commercial type, while formed in the threaded portion 12 of the bolt is a transversely drilled opening 16, suited to receive a coiled compression spring 17, the same abutting at one end against the bottom of the opening 16, the other end pressing against the shoulder of a plunger detent 18, having an acute point 19 adapted to engage in the bottom of the threads formed internally of the nut 14.

This simple form of construction is well adapted for use with the ordinary nut and bolt, the action of the spring forcing the detent outward with sufficient force to create a frictional resistance against the interior of the nut so that the same is held in an adjusted position as against ordinary jar and vibration.

Figure 4:
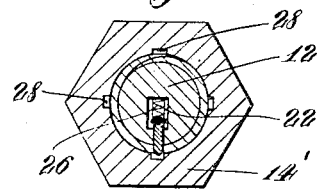
Fig. 4 is a transverse sectional view taken on line 4—4 of Fig. 3.
Figure 3:
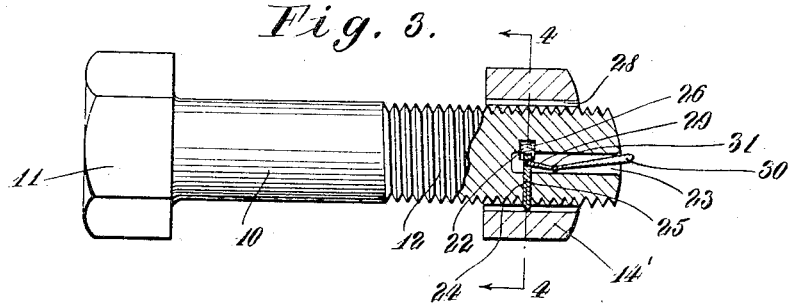
Fig. 3 is a view similar to Fig. 1 but showing a modified form of nut lock.
Figure 5:
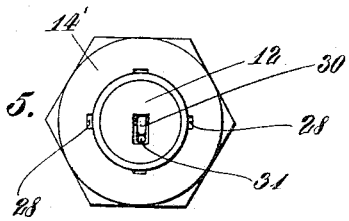
Fig. 5 is an end view looking from the threaded end of the bolt.

In the modification shown in Figs. 3 to 5, a similar recess 22 is formed in the threaded portion 12 of the bolt, the same extending into a rectangular opening 23, formed from the point of the bolt axially inward. In alinement with the recess 22 is a passage 24 in which is engaged a plunger 25, the same being projected outwardly by a compression spring 26, positioned in the opening 22, the outer end of the plunger being adapted to engage in any of the internal slots 28 formed in the nut 14' which like the other nut, is of ordinary construction, thus forming a positive lock, preventing the nut from rotating.

In order to retract the plunger 25, it is formed with a slot in the upper surface, engageable with which is the end 29 of a lever 30, extending outwardly through the opening 23, so that it can be actuated, the lever being bent, and formed with an elbow-like contact element 31 adapted to rest against the side of the recess 23, the inner end 29 being pivotally engaged within the detent 25.

In operation, the nut having been screwed into an adjusted position, during which time the extending end 30 of the lever is pressed so as to retract the spring and plunger, the lever is released, permitting the plunger to enter one of the slots 28 in the nut, where it will remain, locking the nut rigidly to the bolt, until such time as the lever 30 has again been operated.

From the foregoing description, taken in connection with the drawing, it will be readily seen that the devices indicated are capable of maintaining a nut in connection with its bolt.

Having thus described my invention what I claim as new and desire to secure by Letters Patent, is.

In a nut lock, the combination with a bolt having a threaded portion, and a nut engageable therewith, of longitudinal slots formed in said nut across the threads thereof, a transverse opening formed in the threaded portion of the said bolt, an axial passage open at the end of said bolt and extended through to said opening, a plunger slidable in said transverse opening, a spring in said opening adapted to force said plunger outwardly into engagement with the slots formed in said nut, and a lever having its end pivoted in said plunger, said lever extending outwardly through said axial passage and so formed as to retract said plunger when actuated.

In testimony whereof I have affixed my signature.

SAM SAVICKIS.